US011326777B2

(12) United States Patent
Brhel

(10) Patent No.: US 11,326,777 B2
(45) Date of Patent: May 10, 2022

(54) COMBINED BURNER FOR BLOWING OXIDIZING GAS AND FUEL INTO MELTING FURNACE

(71) Applicant: HTT ENGINEERING, SPOL. S R.O., Brno—Ponava (CZ)

(72) Inventor: Jaroslav Brhel, Hamry nad Sazavou (CZ)

(73) Assignee: HTT ENGINEERING, SPOL. S R.O., Ponava (CZ)

( * ) Notice: Subject to any disclaimer, the term of this patent is extended or adjusted under 35 U.S.C. 154(b) by 256 days.

(21) Appl. No.: 16/493,711

(22) PCT Filed: Mar. 13, 2018

(86) PCT No.: PCT/CZ2018/000011
§ 371 (c)(1),
(2) Date: Sep. 12, 2019

(87) PCT Pub. No.: WO2018/166544
PCT Pub. Date: Sep. 20, 2018

(65) Prior Publication Data
US 2020/0032998 A1 Jan. 30, 2020

(30) Foreign Application Priority Data
Mar. 13, 2017 (CZ) ................ CZ2017-140

(51) Int. Cl.
*F23D 14/22* (2006.01)
*F23D 14/32* (2006.01)
(Continued)

(52) U.S. Cl.
CPC ............. *F23D 14/22* (2013.01); *F23D 14/32* (2013.01); *F27B 3/205* (2013.01);
(Continued)

(58) Field of Classification Search
CPC . F23D 11/38; F23D 14/48; F23D 1/00; F23D 2201/20; F23D 14/64; F23D 17/00;
(Continued)

(56) References Cited

U.S. PATENT DOCUMENTS 2,140,088 A * 12/1938 MacDonald ............ F23D 11/04
431/185
5,066,326 A 11/1991 Agarwal et al.
(Continued)

FOREIGN PATENT DOCUMENTS

WO WO 2008/084909 A1 7/2008
WO WO 2010/145845 A1 12/2010
WO WO 2016/071457 A1 5/2016

OTHER PUBLICATIONS

International Preliminary Report on Patentability for PCT/CZ2018/000011 (PCT/IPEA/409) completed on May 17, 2019.
(Continued)

*Primary Examiner* — Jason Lau
(74) *Attorney, Agent, or Firm* — Birch, Stewart, Kolasch & Birch, LLP

(57) ABSTRACT

Combined burner for blowing oxidizing gas and fuel into melting furnace, which is fixedly installed into the furnace and provided with outlet apertures for fuel and oxidizing gas, consists, according to this invention, of fixed part (2) of the burner (1) and of a movable nozzle (4), which is rotatably installed inside the body (2.1) of the fixed part (2) of the burner, supply (7) of the oxidizing gas is connected to the movable nozzle (4) and it is controlled by actuator (3), installed outside of the working space of the furnace, while the axis x2 of the orifice of the movable nozzle (4) is diverted from the rotation axis x1 of the movable nozzle (4) by angle a in the range of 5-60° and the movable nozzle (4) is rotatable around the axis X1 in any direction by angle β in the range of 0-180°. The movable nozzle allows directing
(Continued)

blown gases into various places in the furnace. At the same time, the whole burner is fixedly installed in the wall or ceiling, or the cover of the furnace, and the space of the furnace thus remains sealed.

12 Claims, 5 Drawing Sheets

(51) Int. Cl.
  *F27D 99/00* (2010.01)
  *F27B 3/20* (2006.01)
(52) U.S. Cl.
  CPC ............... *F27D 99/0033* (2013.01); *F23D 2900/14481* (2013.01); *F27D 2099/004* (2013.01)
(58) Field of Classification Search
  CPC .... F23D 1/005; F23D 2201/10; F23D 11/406; F23D 14/24; F23D 2201/101; F23D 2209/20; F23D 2900/14481; F23D 11/42; F23D 14/02; F23D 14/14; F23D 14/26; F23D 14/84; F23D 2207/00; F23D 2208/10; F23D 91/02; F23D 11/02; F23D 11/383; F23D 11/446; F23D 11/448; F23D 14/145; F23D 14/74; F23D 2203/1012; F23D 2203/102; F23D 2203/1023; F23D 2203/104; F23D 2203/105; F23D 23/00; F23D 11/102; F23D 14/22; F23D 14/32; F23D 14/58; F23D 14/70; F23D 1/02; F23D 11/005; F23D 11/04; F23D 11/36; F23D 11/404; F23D 11/46; F23D 14/00; F23D 14/20; F23D 14/30; F23D 14/38; F23D 14/56; F23D 14/586; F23D 14/62; F23D 14/66; F23D 17/005; F23D 2201/30; F23D 2202/00; F23D 2203/007; F23D 2203/106; F23D 2205/00; F23D 2900/00013; F23D 2900/00014; F23D 2900/14003; F23D 2900/14125; F23D 2900/14241; F23D 3/16; F23D 91/00
  See application file for complete search history.

(56) References Cited

U.S. PATENT DOCUMENTS

| | | | |
|---|---|---|---|
| 5,599,375 A * | 2/1997 | Gitman | F23D 14/32 |
| | | | 75/10.42 |
| 5,630,713 A | 5/1997 | Shver et al. | |
| 6,027,333 A | 2/2000 | Fujii et al. | |
| 2010/0159409 A1* | 6/2010 | Richardson | F23D 14/32 |
| | | | 431/181 |

OTHER PUBLICATIONS

International Search Report for PCT/CZ2018/000011 (PCT/ISA/210) dated Jun. 6, 2018.
Written Opinion of the International Searching Authority for PCT/CZ2018/000011 (PCT/ISA/237) dated Jun. 6, 2018.

* cited by examiner

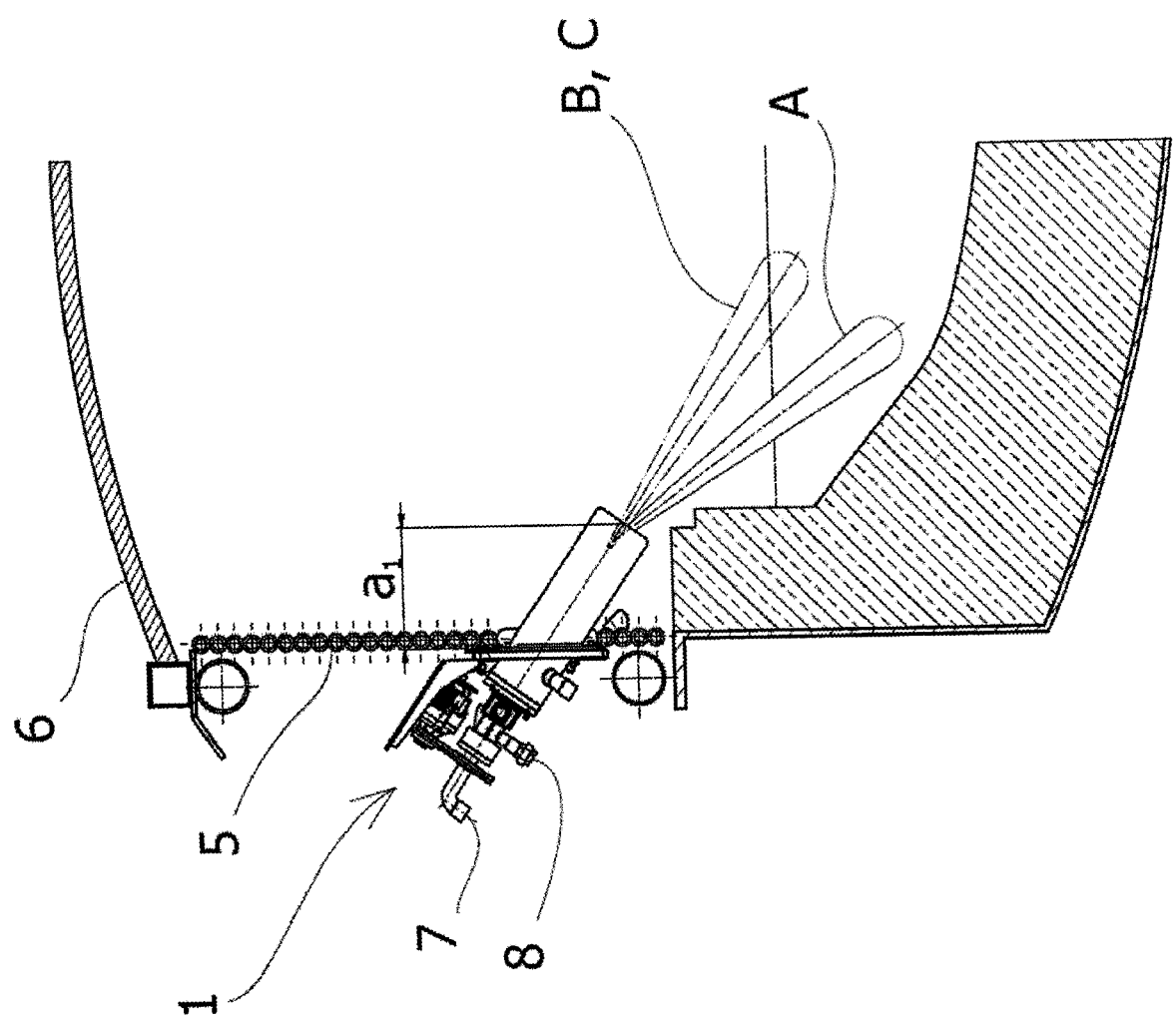

COMBINED BURNER FOR BLOWING OXIDIZING GAS AND FUEL INTO MELTING FURNACE

TECHNICAL FIELD

Combined burner for injecting oxidizing gas and fuel is meant for blowing oxygen and fuel during the melting of scrap in melting furnaces.

STATE OF THE ART

The burners presently used are at the same time used as nozzles and they are fixedly installed into the walls of the furnace. Injected oxidizing gas, which is oxygen or air enriched by oxygen, and injected fuel—e.g. natural gas, are blown into a given fixed place in the furnace. This means that the axis of blown oxygen and fuel doesn't move. This restricts the efficiency of transferring the heat of the flame into the charge and also the efficiency of the blown oxidizing gas, because the reaction happens in a relatively small volume in the space of the furnace, and heat flux decreases with growing temperature of the charge surface. The difference between the temperature of the heat source, which is the temperature of the burning of fuel and some chemical elements of the charge with oxygen, and the temperature of the material delivered to the furnace decreases.

The known movable solutions consist of moving the whole burner nozzle, which is installed on a movable manipulator. The furnace thus has to have an aperture, in which the nozzle is moving, e.g. the working door of the furnace. The furnace thus isn't sealed, when the nozzle is working, which decreases the efficiency of the furnace. Another disadvantage of this solution are large dimensions and difficult installation. A version, in which the burner-nozzle is tilted up and down in vertical axis, is also known. When tilted up, the efficiency of heat transfer decreases, because smaller layer of the charge is above the flame of the burner, which absorbs the heat. A rotational solution of the whole burner also exists, it is described in the U.S. Pat. No. 5,630,713 patent, in which the whole burner, placed in a fixed block in the wall of the furnace, is moving. This solution has the substantial disadvantage that the gap between the fixed and movable part is inside the furnace. Hot gases from the furnace thus get into this gap and the furnace doesn't seal the materials in the furnace—parts of the charge, splashing liquid slag or metal. These particles then gradually fill this gap and the moving of the burner is blocked. Another disadvantage of this solution is that it is meant for installation into the cooled panel of the furnace wall and the face of the burner is in the same plane as the face of the furnace wall. This increases the risk of wear of the furnace wall by flame rebound from the charge.

SUMMARY OF THE INVENTION

These disadvantages mentioned above are removed by the combined burner for blowing oxidizing gas and fuel into the melting furnace, which is fixedly installed into the furnace and provided with outlet apertures for fuel and oxidizing gas according to the invention, which is based on the fact, that the burner consists of a fixed part of the burner and a movable nozzle, which is rotationally installed inside the body of the fixed part of the burner. Supply of oxidizing gas is connected to the nozzle and the nozzle motion is controlled using an actuator installed outside of the working space of the furnace. The axis $x_2$ of the orifice of the movable nozzle is diverted from the axis $x_1$ of the rotation of the movable nozzle by an angle in the range of 5 to 60° and the movable nozzle is rotatable around the axis $x_1$ in any direction by the angle β in the range of 0 to 180°. The foundation is also that the burner is placed in a wall or ceiling of the furnace and that the body of the fixed part of the burner is arranged in the outside fixed housing cooled by liquid or gas, and it protrudes into the space of the furnace by the distance $a_1$ in the range of 0 to 2000 mm. It is also important that the movable nozzle is provided with at least one aperture for oxidizing gas and apertures for the fuel at the outlet.

The newly provided combined burner according to the invention is thus equipped with a movable nozzle inside, which allows directing blown gases into various places in the furnace. The whole burner is at the same time fixedly installed in the wall or ceiling, or the cover of the furnace, and the space of the furnace thus remains sealed. This solution has several basic advantages:

the furnace remains sealed—air is not sucked in by the aperture for movement of the nozzle
 the movable part of the nozzle is built into the static part and movable mounting is protected from the impact of the atmosphere in the furnace, or splashes of the melted material in the furnace
 eccentric rotational movement moves the flame—the jet of blown gases in horizontal and vertical plane at the same time.

Hot gases affect various places on the charge and this increases the heat flux into the material. Moving jet of oxidizing gas, e.g. oxygen, allows to cut the heated charge, similar to the cutting burner during splitting of the material. This causes faster splitting of the charge directly in the furnace and its falling into the melted bath in the furnace. Parts of the charge, which get thus into the liquid bath in the lower part of the furnace, are thus melted faster, which increases the efficiency of the whole process. After the charge is melted, the oxidizing gas is blown directly into the liquid bath in the furnace. We call this working mode the "oxygen lance mode". In the oxygen lance mode, it is possible to completely stop the fuel input and only oxidizing gas is thus blown into the furnace.

This combined burner can be used in any furnace for heating and/or melting of the charge. We mention typical applications as examples: melting of metal charge (scrap, additives, metallic charge) in electric arc furnace, melting the charge in chamber furnace, where the burners could be in the walls or ceiling of the furnace—e.g. melting of non-iron metals, glass, etc., also in heating furnaces for metal charge prior to further processing, e.g. prior to forging, rolling, etc. The applications mentioned are just examples of possible use, which could be broadened to other processes as well.

LIST OF FIGURES ON THE DRAWING

An example embodiment of the combined burner for blowing oxidizing gas and fuel into the melting furnace including actuator is depicted at FIG. 1, its detail D1—FIG. 2—shows the orifice of the burner.

FIG. 3 presents the turning of the internal movable nozzle.

FIG. 5 shows the installation of the burner and positions of gas jets in three different situations in side section.

EXAMPLES OF THE INVENTION

Figure 1:
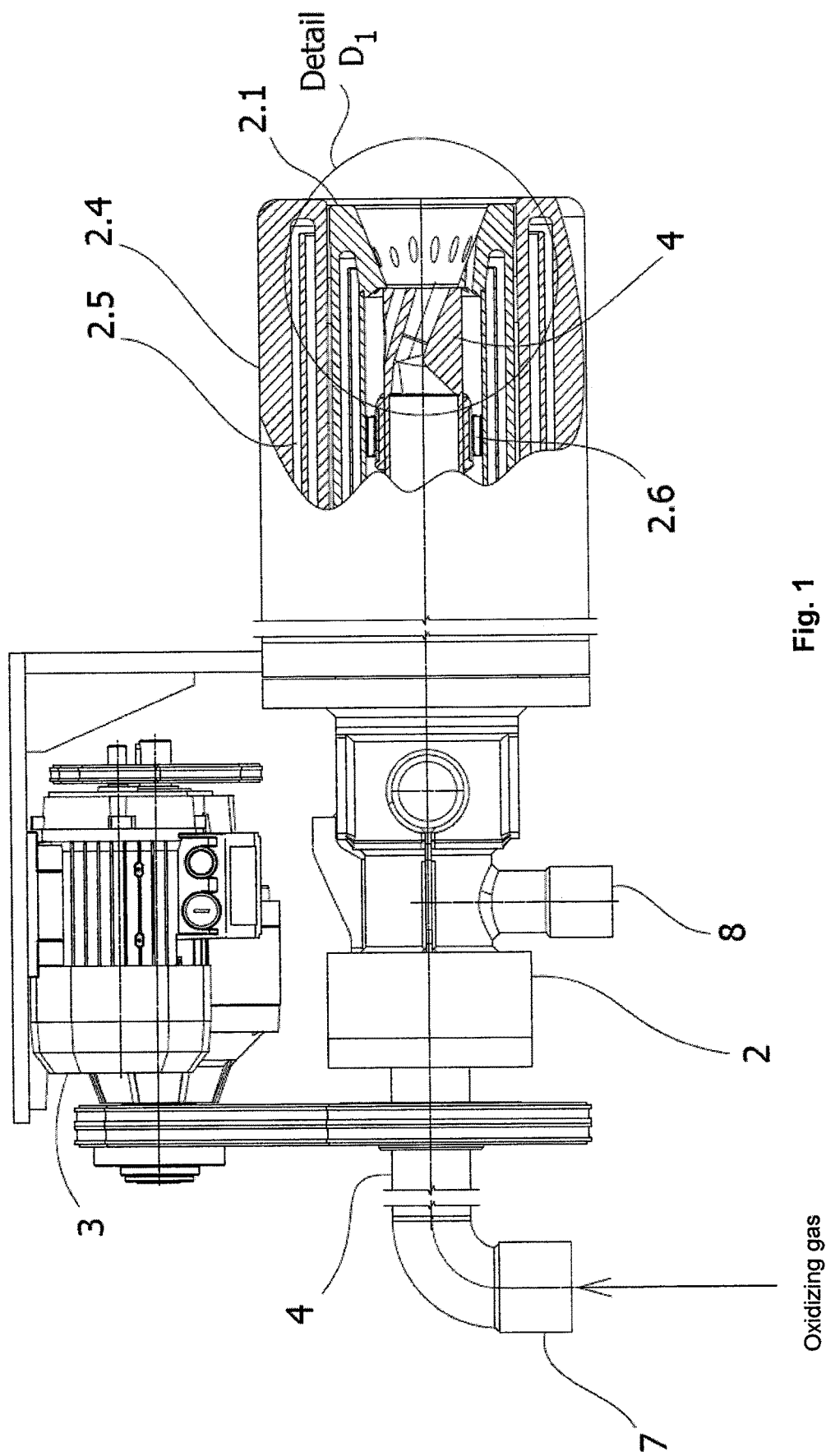
Figure 2:
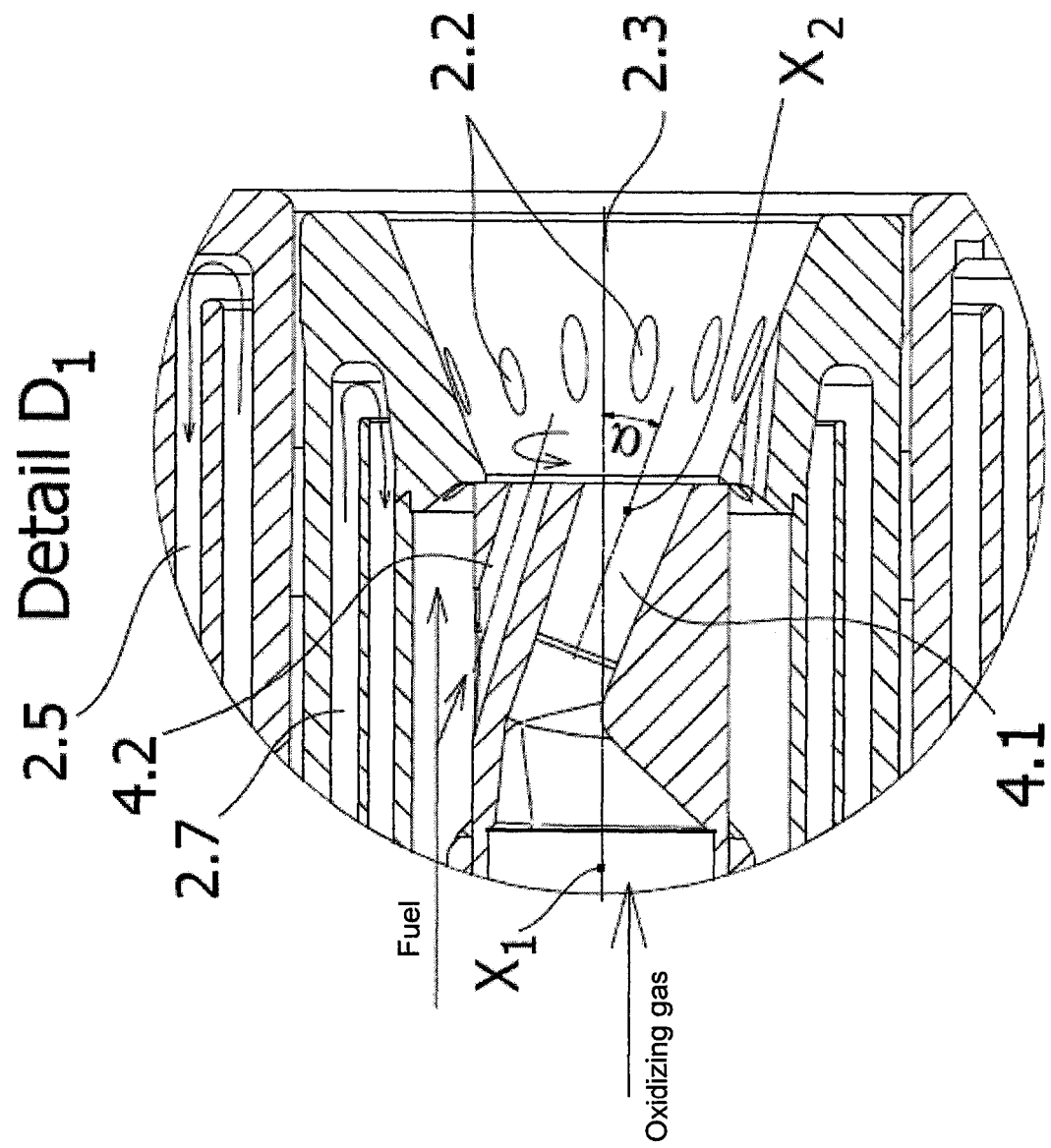
Figure 3:
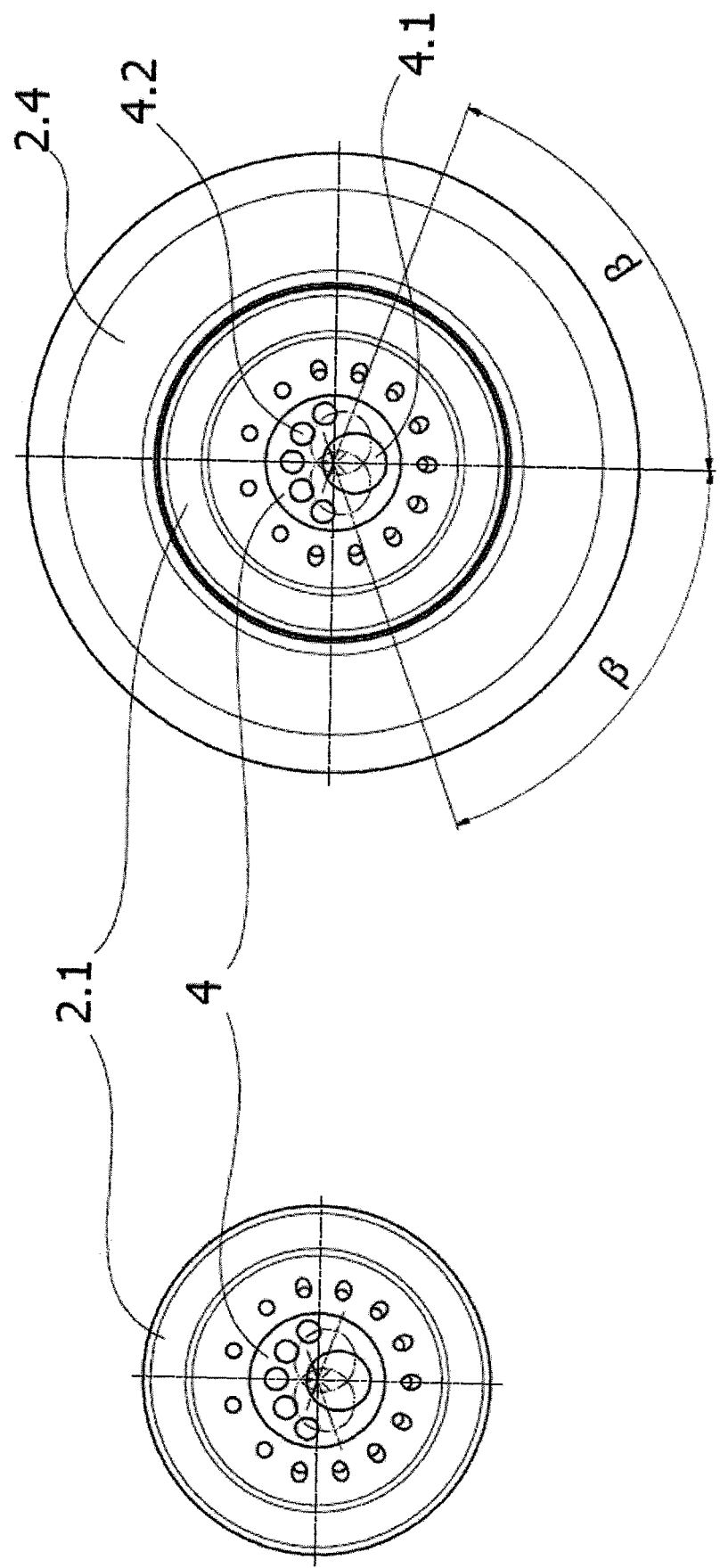
Figure 4:
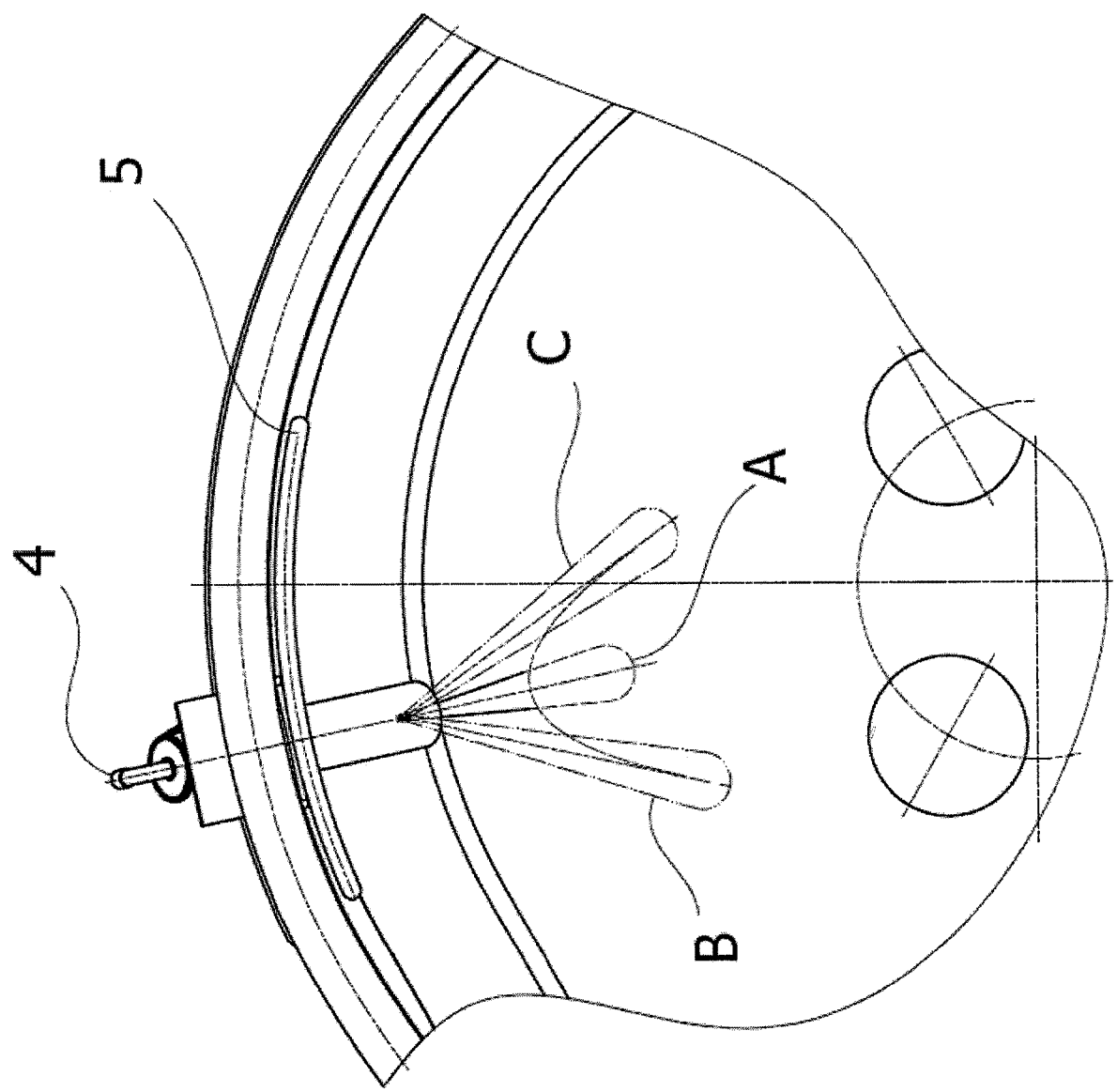
FIG. 4 is a plan view showing the installation of the burner in the furnace and the positions of gas jets in three different situations.

Combined burner 1 consists of a fixed part 2, whose main part consists of a body 2.1. Movable nozzle 4 is rotatably installed inside the body 2.1. Body 2.1 is provided with protective outer housing 2.4, fixedly connected with wall 5 or cover 6 or the ceiling of the furnace. Outside fixed housing 2.4 is cooled by liquid or gas, which are forced into the channels 2.5, created in the outside housing 2.4. The body 2.1 of the burner is also provided with cooling channels 2.7 for cooling the face of the burner by liquid or gas. Wall 5 of the furnace can consist of cooled panels, or could be made of refractory material. Oxidizing gas is brought to the movable nozzle 4 by the inlet 7 and fuel is brought to the fixed part 2 of the burner by inlet 8. The burner is installed such that the orifice of the burner is in the distance $a_1$ from the wall 5 of the furnace. The distance $a_1$ is chosen so that the jet of gases from the burner doesn't collide with the lining of the furnace. The body 2.1 of the fixed part 2 of the burner is protruding into the space of the furnace from the wall 5 by the distance $a_1$, in this case 800 mm long. Movable nozzle 4 is controlled by an actuator 3, installed outside of the working space of the furnace and it is rotatable around the rotation axis $x_1$ in any direction by the angle β, in this case 70°. Axis $x_2$ of the orifice of the movable nozzle 4 is diverted from the rotation axis $x_1$ of the movable nozzle 4 by the angle α, in this case 30°. Turned positions of the movable nozzle 4 are marked by working positions A, B and C. When the movable nozzle 4 is turned by the angle beta β, the jet of gases blown by the fixed part 2 of the burner into the furnace is moved to the position B, respective to the position C when turned in the other direction. The working range of the burner is thus anywhere between the positions B and C, middle position is marked as position A.

Outside cover 2.4 around the body 2.1 of the burner has a rugged design resistant to high temperature and mechanical damage by the charge of the furnace. Outside housing 2.4 is liquid cooled according to the example embodiment, or it could be manufactured from refractory material.

The movable nozzle 4 contains aperture 4.1, through which the oxidizing gas—e.g. oxygen—flows and the fuel—e.g. natural gas—flows through other apertures 4.2. The movable nozzle is installed in bearing 2.6 or rotatable housing with apertures for the flow of fuel. The fuel also flows through apertures 2.2, created in the body 2.1 of the fixed part of burned 2. Fuel and oxidizing gas are mixed together in the mixing space 2.3 in the body 2.1 of the fixed part. The aperture 4.1 of the movable nozzle 4 is in the shape of Laval's nozzle for obtaining supersonic speed of the oxidizing gas. Aperture 4.1 with the axis $x_2$ is inclined under angle α from the axis $x_1$, which is the rotation axis of the movable nozzle 4.

When the movable nozzle 4 rotates around the axis $x_1$ by the angle β, the jet of gases flowing through the aperture 4.1 with axis $x_2$ flows into various places of the furnace, depending on the angle β of diversion from the vertical plane. The angle β can be up to the range of 180°. For different types of applications, it is possible to interchange the apertures for the flows of fuel and oxidizing gas, for creating various types of flame. This means that the fuel could flow through the aperture 4.1 and oxidizing gas through the apertures 4.2.

The motion of the movable nozzle 4 is provided using actuator 3, which is installed on the furnace, or it could be connected to the fixed part 2 of the burner. Actuator 3 can be powered by an electric motor with gearing, hydraulically, pneumatically or in another way, it isn't important from the point of view of the function of the burner.

The invention claimed is:

1. A combined burner for blowing oxidizing gas and fuel into a melting furnace, the combined burner being fixedly installed into the melting furnace and being provided with outlet apertures for fuel and oxidizing gas, wherein the burner comprises:
   a fixed part; and
   a movable nozzle, the movable nozzle having the outlet apertures for both fuel and oxidizing gas to flow out of the movable nozzle,
   wherein the movable nozzle is rotatably installed inside a body of the fixed part of the burner, and is rotatable about a rotation axis $x_1$,
   wherein a supply of the oxidizing gas is connected to the movable nozzle and motion of the movable nozzle is controlled by an actuator, installed outside of a working space of the melting furnace,
   wherein a central axis $x_2$ of at least one of the outlet apertures of the movable nozzle is diverted from the rotation axis $x_1$ of the movable nozzle by angle α in a range of 5-60°, and the movable nozzle is rotatable around the rotation axis $x_1$ in any direction by an angle β in a range of 0-180°, such that when the movable nozzle is rotatable around the rotation axis $x_1$, a supplying direction of the fuel or the oxidizing gas that flows out of said at least one of the outlet apertures moves between two different operation positions.

2. The combined burner according to claim 1, wherein the furnace is an electric arc furnace.

3. The combined burner according to claim 1, wherein the burner is placed in a wall or ceiling of the furnace.

4. The combined burner according to claim 1, wherein the body of the fixed part of the burner is installed in an outer fixed housing cooled by liquid or gas, and the body protrudes into a space of the furnace by a distance $a_1$ in the range of 0-2000 mm.

5. The combined burner according to claim 1, wherein the outlet apertures include at least one outlet aperture for the oxidizing gas and a plurality of outlet apertures for the fuel.

6. The combined burner according to claim 2, wherein the burner is placed in a wall or ceiling of the furnace.

7. The combined burner according to claim 2, wherein the body of the fixed part of the burner is installed in an outer fixed housing cooled by liquid or gas, and the body protrudes into the space of the furnace by a distance $a_1$ in the range of 0-2000 mm.

8. The combined burner according to claim 3, wherein the body of the fixed part of the burner is installed in an outer fixed housing cooled by liquid or gas, and the body protrudes into the space of the furnace by a distance $a_1$ in the range of 0-2000 mm.

9. The combined burner according to claim 2, wherein the outlet apertures include at least one outlet aperture for the oxidizing gas and a plurality of outlet apertures for the fuel.

10. The combined burner according to claim 3, wherein the outlet apertures include at least one outlet aperture for the oxidizing gas and a plurality of outlet apertures for the fuel.

11. The combined burner according to claim 4, wherein the outlet apertures include at least one outlet aperture for the oxidizing gas and a plurality of outlet apertures for the fuel.

12. The combined burner according to claim 2, wherein a central axis of each of the outlet apertures is parallel with said central axis $x_2$.

\* \* \* \* \*